(12) United States Patent
Yamashita

(10) Patent No.: US 6,311,482 B1
(45) Date of Patent: Nov. 6, 2001

(54) AIR-FUEL RATIO CONTROL APPARATUS FOR INTERNAL COMBUSTION ENGINES

(75) Inventor: Yukihiro Yamashita, Takahama (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 09/612,559

(22) Filed: Jul. 7, 2000

(30) Foreign Application Priority Data

Aug. 9, 1999 (JP) .................................................. 11-225331

(51) Int. Cl.[7] .................................................. F01N 3/00
(52) U.S. Cl. ................................ 60/285; 60/284; 60/300; 60/301
(58) Field of Search .............................. 60/284, 285, 300, 60/301

(56) References Cited

U.S. PATENT DOCUMENTS

| | | | |
|---|---|---|---|
| 5,462,039 | * 10/1995 | Mamiya et al. | 60/284 |
| 5,491,975 | * 2/1996 | Yamashita et al. | 60/285 |
| 5,537,321 | * 7/1996 | Yoshizaki et al. | 60/285 |
| 5,678,402 | * 10/1997 | Kitagawa et al. | 60/285 |
| 5,785,138 | * 7/1998 | Yoshida | 60/300 |
| 5,974,788 | * 11/1999 | Hepburn et al. | 60/285 |
| 5,979,158 | * 11/1999 | Kaiser et al. | 60/300 |
| 5,996,337 | * 12/1999 | Blosser et al. | 60/285 |

FOREIGN PATENT DOCUMENTS

| | | |
|---|---|---|
| 0 312 835 | 4/1989 | (EP) . |
| 5-272396 | 10/1993 | (JP) . |
| 8-158858 | 6/1996 | (JP) . |

* cited by examiner

Primary Examiner—Thomas Denion
Assistant Examiner—Tu M. Nguyen
(74) Attorney, Agent, or Firm—Nixon & Vanderhye P.C.

(57) ABSTRACT

An air-fuel ratio control apparatus for internal combustion engine includes exhaust gas purifying catalysts mounted on the upstream and downstream sides of an exhaust passage of an internal combustion engine, a fuel injector for injection of a desired quantity of fuel into a cylinder of the internal combustion engine in accordance with an engine operating condition, and an ECU. The ECU changes an air-fuel ratio to lean and rich magnitudes by alternately increasing and decreasing the quantity of fuel injection. The lean/rich changeover of the exhaust air-fuel ratio is performed at an interval including a period during which the lean and rich components in the exhaust gas react with the upstream catalyst and a period thereafter during which an unreacted exhaust gas passes through the upstream catalyst.

13 Claims, 13 Drawing Sheets

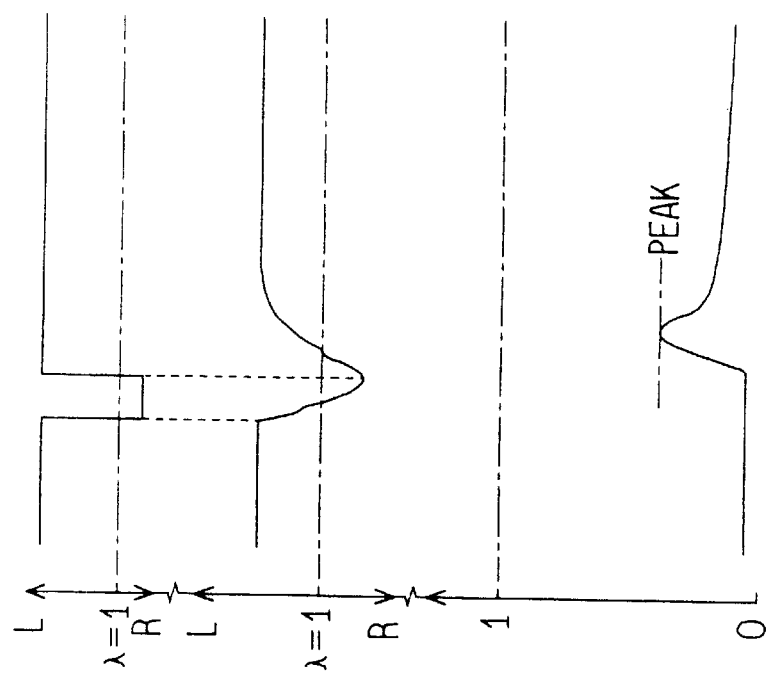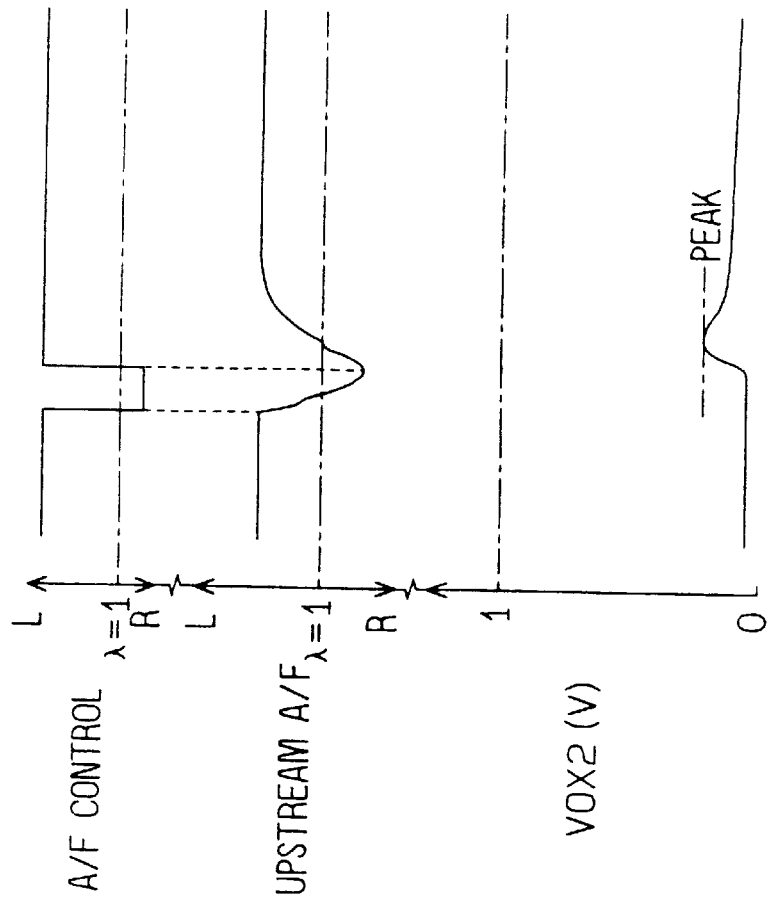

AIR-FUEL RATIO CONTROL APPARATUS FOR INTERNAL COMBUSTION ENGINES

CROSS REFERENCE TO RELATED APPLICATION

This application relates to and incorporates herein by reference Japanese Patent Application No. 11-225331 filed on Aug. 9, 1999.

BACKGROUND OF THE INVENTION

The present invention relates to an air-fuel ratio control apparatus for internal combustion engines which uses catalyst for purifying exhaust gases at the upstream and downstream sides of the exhaust pipe of the internal combustion engine, to thereby control the air-fuel mixture ratio by regulating the amount of fuel injection to cylinders according to engine operating conditions.

As a conventional technology for warming up an exhaust gas purifying catalyst in a short period of time, injection dither is proposed to increase and decrease the amount of fuel injection for alternately leaning and enriching fuel in relation to the stoichiometric air-fuel ratio ($\lambda=1$). The injection dither is performed to supply oxygen ($O_2$) and unburned fuel (HC and CO) to the catalyst by increasing or decreasing the amount of fuel to be injected, for reaction and heating in the presence of the catalyst, thereby raising the catalyst temperature to accomplish early activation of the catalyst. Generally, when the injection dither is carried out, the target air-fuel ratio is changed over by leaning and enriching the fuel at intervals of 1 to 5 injections by fuel injectors.

However, the method of effecting catalyst activation by the injection dither is effective only for warming up one catalyst from a cold state. However, in a system in which catalysts are arranged in series in the exhaust pipe, the catalyst on the upstream side is early warmed up. If the injection dither is kept operated after the completion of the warm-up of the catalyst, the catalyst on the upstream side will be overheated, exceeding the permissible temperature. If, however, the injection dither is stopped upon the completion of the catalyst warm-up in an attempt to obviate this disadvantage, there will take place such a problem that the catalyst on the downstream side will not lower to a desired temperature.

In JP-A-8-158858, a front catalyst is mounted on the upstream side of the exhaust pipe, while a main catalyst is disposed on the downstream side. During the period of front catalyst activation after engine start-up, the exhaust gas temperature rises to positively activate the front and main catalysts. After the activation of the front catalyst, the exhaust gas temperature rise stops and the main catalyst is activated by the use of the injection dither which increases and decreases the air-fuel ratio. The front catalyst can be prevented from overheating.

In this apparatus, however, the injection dither is carried out after the activation of the front catalyst. The heating of the front catalyst can not be prevented, presenting a problem of catalyst overheat. Also if one tries to restrain the heating of the front catalyst, there will occur such a problem as a deteriorated activation effect of the main catalyst.

SUMMARY OF THE INVENTION

It is an object of the present invention to provide an air-fuel ratio control apparatus for internal combustion engines which is capable of proper temperature control of both catalysts provided in series in an engine exhaust pipe to thereby ensure more efficient purification of exhaust gases.

According to the present invention, an air-fuel ratio control apparatus for internal combustion engines comprises exhaust gas purifying catalysts mounted on the upstream and downstream sides of an exhaust passage of an internal combustion engine, a fuel injector for injection of a desired quantity of fuel into a cylinder of the internal combustion engine in accordance with an engine operating condition, and an electronic control unit. The control unit changes an air-fuel ratio to lean and rich magnitudes by alternately increasing and decreasing the quantity of fuel injection. The lean/rich changeover of the exhaust air-fuel ratio is performed at an interval including a period during which the lean and rich components in the exhaust gas react with the upstream catalyst and a period thereafter during which an unreacted exhaust gas passes through the upstream catalyst.

BRIEF DESCRIPTION OF THE DRAWINGS

Other objects, features and advantages of the present invention will become more apparent from the following detailed description made with reference to the accompanying drawings. In the drawings:

FIGS. 10A and 10B are timing diagrams showing sensor output waveforms before and after catalyst deterioration, respectively;

DETAILED DESCRIPTION OF THE PREFERRED EMBODIMENT

First Embodiment

Figure 1:
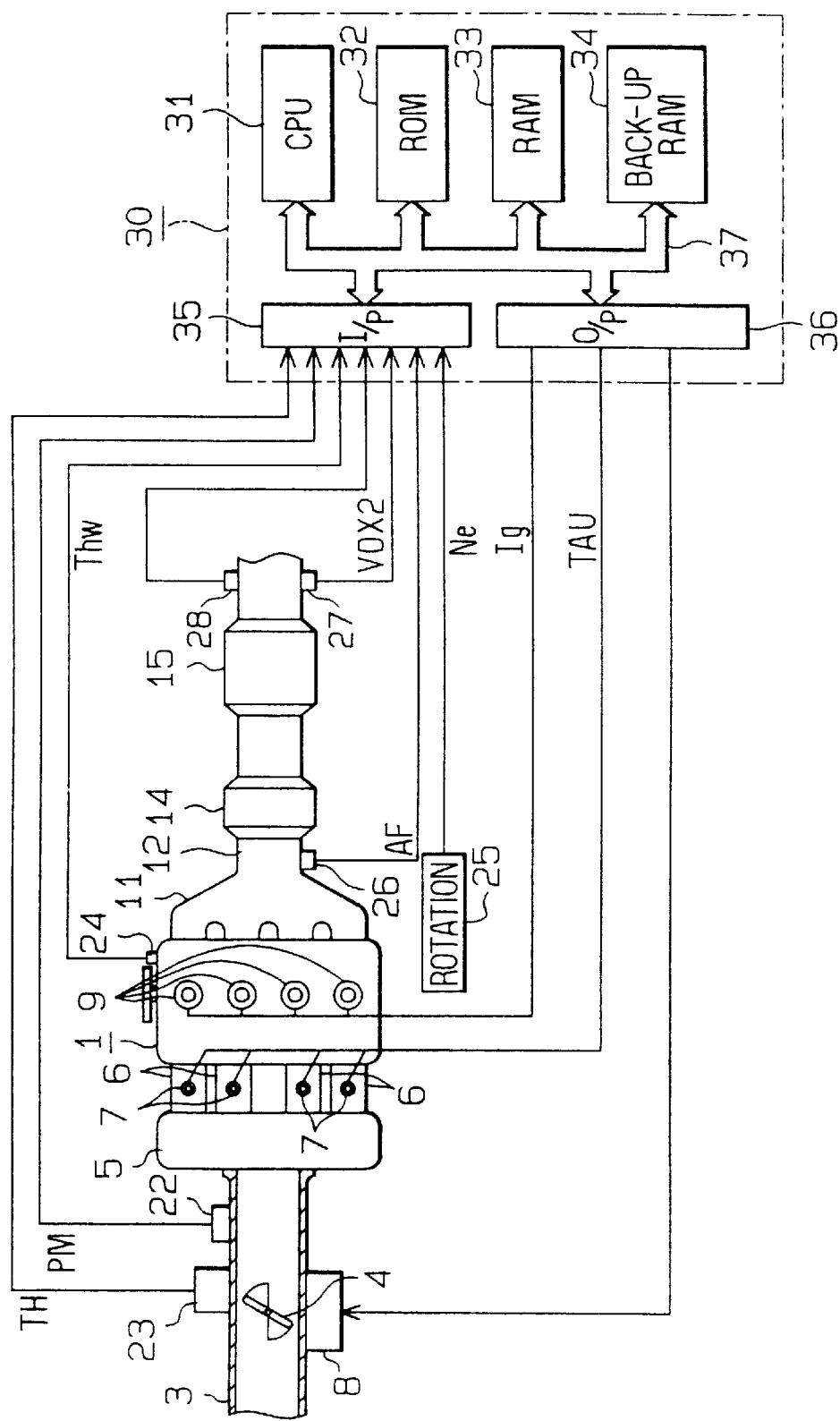
FIG. 1 is a schematic diagram showing an engine control system embodying an air-fuel ratio control apparatus according to a first embodiment of the present invention.

An air-fuel ratio control apparatus according to a first embodiment is shown in FIG. 1. In the present embodiment, the air-fuel ratio control apparatus is embodied for a gasoline engine (internal combustion engine) 1 for motor vehicles. In this apparatus, the amount of fuel to be injected into the engine is regulated to control the air-fuel mixture ratio by means of an electronic control unit (ECU) 30. Furthermore, a plurality of catalysts 14 and 15 disposed in an exhaust pipe 12 for purifying the exhaust gases are activated by injection dither control, thus providing a system for effective purification of the exhaust gases.

Specifically, as shown in FIG. 1, the engine 1 is a four-cylinder, four-stroke spark-ignition type. Intake air to be supplied into the engine 1 is taken in at an air cleaner and passes through an intake pipe 3, a throttle valve 4, a surge tank 5, and an intake manifolds 6 from the upstream. The intake air is then mixed in each intake manifold 6 with fuel injected from a fuel injector 7 mounted on each manifold 6. The air-fuel mixture thus formed at a predetermined air-fuel ratio is supplied to each cylinder. At this time, the opening-closing operation of the throttle valve 4 is electronically controlled by a throttle actuator 8.

Each cylinder of the engine 1 is provided with a spark plug 9, which ignites the air-fuel mixture in each cylinder at a predetermined timing. A DLI (Distributorless Ignition) system is adopted, in which the ignition energy from an ignition coil is supplied directly to the spark plug 9 in each cylinder, not through a distributor. The exhaust gas coming out from each cylinder after combustion passes through exhaust manifolds 11 and the exhaust pipe 12. After passing through a three-way catalyst 14 provided in the exhaust pipe 12, the exhaust gas flows further through a NOx catalyst 15 and then finally discharged out into the atmosphere.

The three-way catalyst 14 has a relatively small capacity, and operates as a start catalyst which is activated quickly in the engine start-up period. The NOx catalyst 15 is an occlusion-reduction type, which operates to occlude NOx present in the exhaust gases during combustion mainly under a lean air-fuel ratio and then to discharge after reducing with rich component (CO, HC, etc.) the NOx thus occluded during combustion under the lean air-fuel ratio.

In the intake pipe 3, an intake pressure sensor 22 is provided for detecting a vacuum pressure in the intake pipe (intake pressure PM) on the downstream side of the throttle valve 4. The throttle valve 4 is coupled with a throttle sensor 23 for detecting the amount of opening angle of the throttle valve 4 (throttle opening angle TH). The throttle sensor 23 functions to output an analog signal in accordance with the throttle opening angle TH. The throttle sensor 23 has a built-in idle switch, also outputting a detection signal when the throttle valve 4 is at the fully-closed position.

In the cylinder block of the engine 1, a coolant temperature sensor 24 is installed. The coolant temperature sensor 24 detects the engine coolant temperature Thw. On a crankshaft (not shown), an engine rotation speed sensor 25 is mounted for detecting the number of revolutions of the engine 1 (engine speed Ne). The engine speed sensor 25 outputs 24 pulse signals at an equal interval every two revolutions of the crankshaft, that is, every 720° CA.

In the exhaust pipe 12, a limit-current type air-fuel ratio (A/F) sensor 26 is disposed on the upstream side of the three-way catalyst 14, and an $O_2$ sensor (rear $O_2$ sensor) is mounted on the downstream side of the NOx catalyst 15. The A/F sensor 26 outputs a wide-area, linear air-fuel ratio signal (AF) in proportion to the concentration of oxygen in the exhaust gas (or the concentration of carbon monoxide CO in the unburned gas). The rear $O_2$ sensor 27 outputs an electromotive force signal (VOX2) indicating that the exhaust gas varies with the air-fuel ratio, that is, a lean or rich mixture. At the downstream side of the NOx catalyst 15, a catalyst temperature sensor 28 is provided for detecting the temperature of the NOx catalyst 15.

The ECU 30 is constructed as an arithmetic calculation circuit including a CPU 31, a ROM32, a RAM33, and a back-up RAM 34. The ECU 30 is connected to each sensor and actuator through a bus 37, an input port 35 and an output port 36. The input port 35 is for inputting a detection signal from each sensor, and the output port 36 is for outputting a control signal to each actuator. The ECU 30 inputs detection signals (intake pressure PM, throttle opening angle TH, coolant temperature Thw, engine speed Ne, air-fuel ratio (AF), etc.) from the various sensors through the input port 35. Then, such control signals for controlling the amount of fuel injection TAU and the ignition timing Ig are calculated on the basis of these various values, and are outputted to the fuel injectors 7 and the spark plugs 9 through the output port 36. The ECU 30 also drives the throttle actuator 8 to adjust the opening angle of the throttle valve 4, thereby controlling the amount of intake air to be supplied into the engine 1.

The present embodiment is aimed at raising the temperature of the downstream NOx catalyst 15 to a proper value without overheating the upstream three-way catalyst 14 provided in the exhaust pipe 12. To realize this aim, injection dither control is used to alternately change the air-fuel ratio between lean ratio and rich ratio relative to the stoichiometric air-fuel ratio ($\lambda=1$). The temperature of the upstream and downstream catalysts 14 and 15 can be controlled as desired particularly by adjusting the lean and rich changeover period (the number of injections) in the injection dither control.

Figure 2:
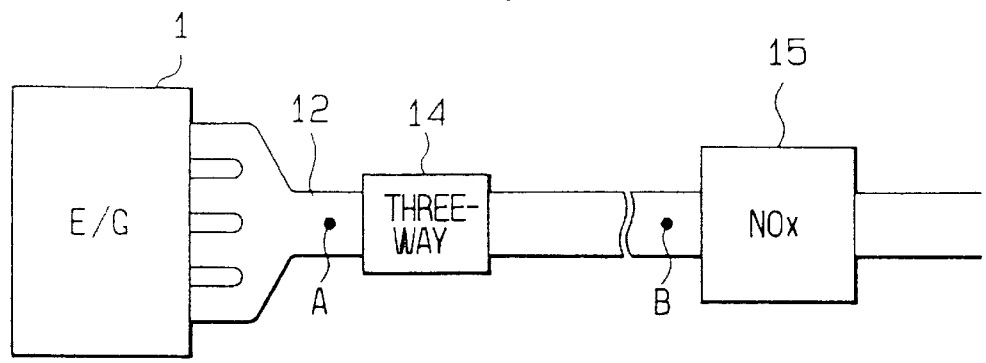
FIG. 2 is a schematic diagram of an engine exhaust system provided in the first embodiment.

Here, the above injection dither control is described with reference to FIG. 2 and FIG. 3. In FIG. 2, a point A is an air-fuel ratio measuring point immediately before the three-way catalyst 14, and the point B is an air-fuel ratio measuring point immediately before the NOx catalyst 15.

The exhaust gas of lean or rich atmosphere is directly supplied to the three-way catalyst 14 located near the engine 1 when the air-fuel ratio in the exhaust gas being discharged from the engine 1 during injection dither control is changed between lean and rich, allowing reaction of the lean components ($O_2$) and the rich components (HC, CO) of the exhaust gases before and after the changeover of the air-fuel ratio. That is, at the point A immediately before the three-way catalyst 14, the lean components and the rich components in the hatched portion shown in FIG. 3 react, thereby raising the temperature of the three-way catalyst 14 to some extent. The hatched portion in FIG. 3 shows the lean components or the rich components which temporarily stay for reaction in the three-way catalyst 14. The amount of the lean or rich air-fuel mixture depends upon the catalyst capacity.

If the state of lean or rich air-fuel mixture continues, no more reaction will take place between the lean and rich components, ending the reaction. Therefore the exhaust gas as unreacted passes through the three-way catalyst 14, releasing heat to thereby start gradually lowering the temperature of the three-way catalyst 14. Because of the injection dither control, the temperature of the three-way catalyst 14 repeats slight rises and drops. Generally, however, the catalyst temperature is maintained unchanged.

Figure 3:
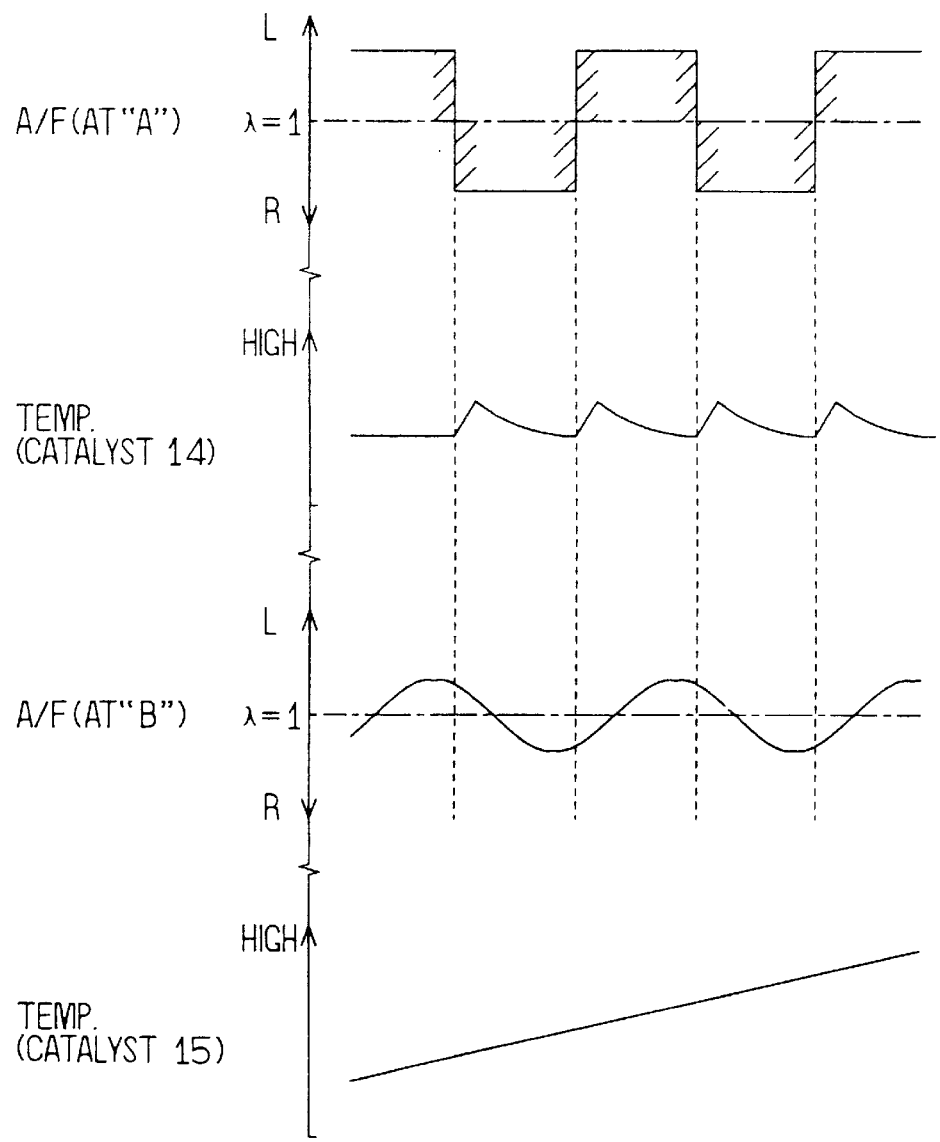
FIG. 3 is a timing diagram showing operation of injection dither control executed in the first embodiment.

In the meantime, the lean and rich components of the exhaust gas that has passed through the three-way catalyst 14 are mixed when flowing in the exhaust pipe 12, achieving an averaged air-fuel mixture ratio at the point B immediately before the NOx catalyst 15 as shown in FIG. 3. In this case, since the exhaust gas including the lean/rich components averaged to some extent is being supplied to the NOx catalyst 15 on the downstream side, an exothermic reaction at the NOx catalyst 15i s accelerated, resulting in nearly uniform temperature rise of the NOx catalyst 15.

In the conventional injection dither control generally adopted, the lean/rich changeover is effected at intervals of around 1 to 5 injections. In the injection dither control of the present embodiment, however, the lean/rich changeover is performed at intervals of around 20 to 100 injections. The lean/rich changeover interval (number of injections) during injection dithering is desired to be set so that the heating value and the heat release value will be equal, whereby the temperature of the three-way catalyst 14 can be kept without rising or dropping.

Figure 4:
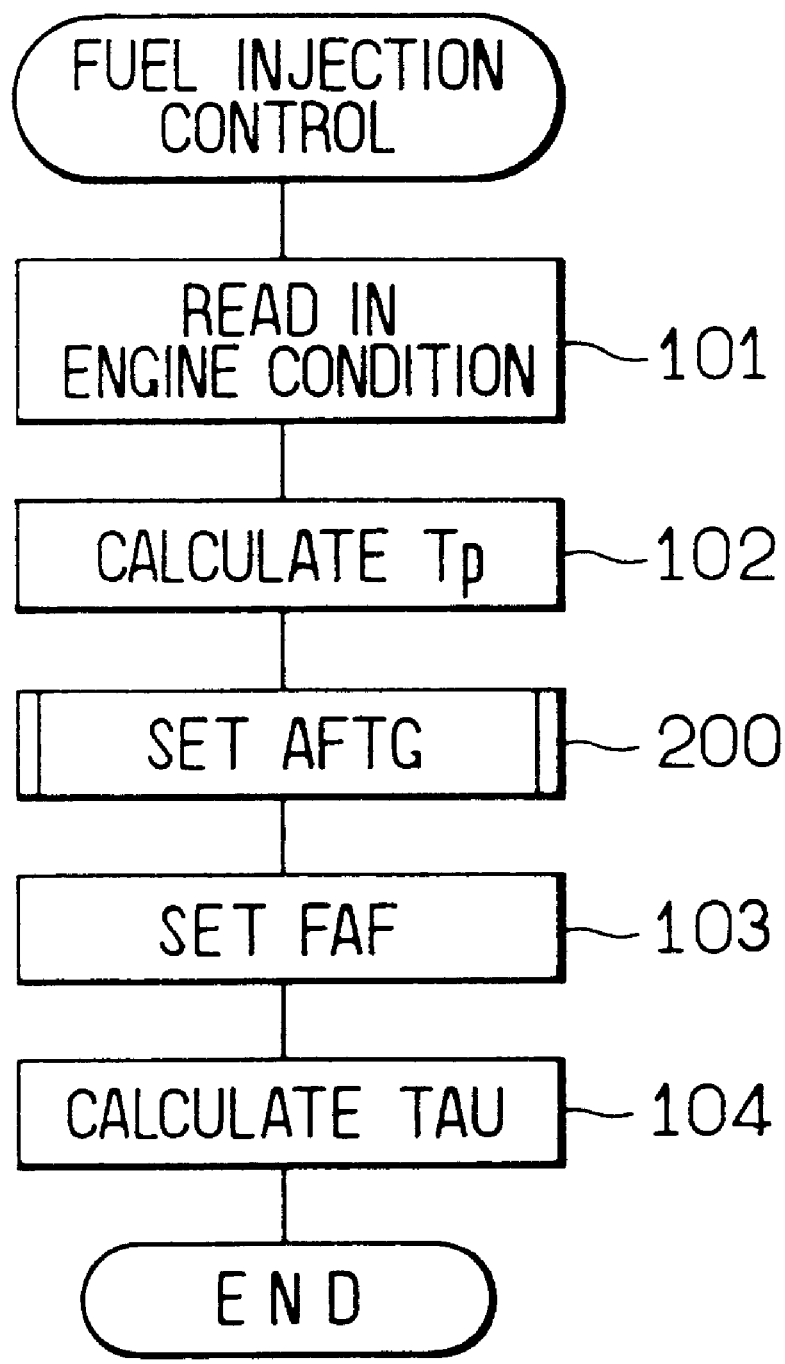
FIG. 4 is a flow diagram showing a fuel injection control routine executed in the first embodiment.

Next, computation by the CPU 31 for realizing the injection dither control stated above will be explained with reference to flow diagrams in FIGS. 4 to 8. FIG. 4 is a flow diagram showing the fuel injection control routine to be executed by the CPU 31. The routine is performed every fuel injection into each cylinder (every 180° CA).

First at step 101, when the routine in FIG. 4 is started, results of sensor detection indicating the engine operating condition (engine speed Ne, intake pressure PM, and coolant temperature Thw) are read in. At the following step 102, a basic injection quantity Tp at each engine speed Ne and intake pressure PM is computed by the use of a basic injection map pre-stored in the ROM 32. Then, at step 200, a target air-fuel ratio AFTG to which the actual air-fuel ratio is controlled.

Subsequently, at step 103, an air-fuel ratio correction coefficient FAF is set on the basis of a deviation between the actual air-fuel ratio AF (sensor detection value) and the target air-fuel ratio AFTG. In the present embodiment, the air-fuel ratio feedback (F/B) control based on the advanced control theory is executed. The FAF value set on the basis of the output of the A/F sensor 26 is corrected in such a manner that the mean FAF value will decrease to reduce the quantity of injected fuel when the output voltage VOX2 of the rear $O_2$ sensor 27 at the downstream of the NOx catalyst exceeds a comparison reference voltage corresponding to the stoichiometric air-fuel ratio. It is understood that, as a matter of course, the F/B control may be effected by the PID (proportional+integral+derivative) control method.

After setting the FAF value, at step 104, the following equation is used to calculate the final fuel injection quantity TAU from the basic injection quantity Tp, air-fuel ratio correction coefficient FAF, and other correction coefficients FALL (various correction coefficients such as coolant temperature, air-conditioner load, etc.).

TAU=Tp·FAF·FALL

After the computation of the fuel injection quantity TAU, a control signal proportional to the TAU value is outputted to the fuel injector 7, thus completing the routine.

The F/B control stated above is carried out when the F/B conditions are satisfied. That is, the coolant temperature Thw exceeds a predetermined temperature, the engine 1 is being operated neither at a high speed nor in a highly loaded condition, and the A/F sensor 26 is in an activated condition. When the F/B conditions are not established, the air-fuel ratio open-loop control is performed (FAF=1.0).

Next, the target air-fuel ratio AFTG setting procedure (routine at step 200) will be explained by referring to flow diagrams in FIGS. 5 and 6. In this routine, the rich control is temporarily conducted in the course of the lean control.

That is, rich purge is performed. In the lean control and the rich purge control, the target air-fuel ratio AFTG is set as required. At this time, the target air-fuel ratio AFTG is so set that the air-fuel ratio will be varied relative to the stoichiometric air-fuel ratio ($\lambda$=1) alternately between lean and rich relative to the stoichiometric air-fuel ratio.

The rich purge aims at reducing and releasing mainly NOx occluded in the NOx catalyst 15 with the rich components, thereby recovering the NOx purifying capacity of the catalyst. The injection dither control is performed to increase only the temperature of the NOx catalyst 15 on the downstream side without raising the temperature of the three-way catalyst 15 on the upstream side.

Figure 5:
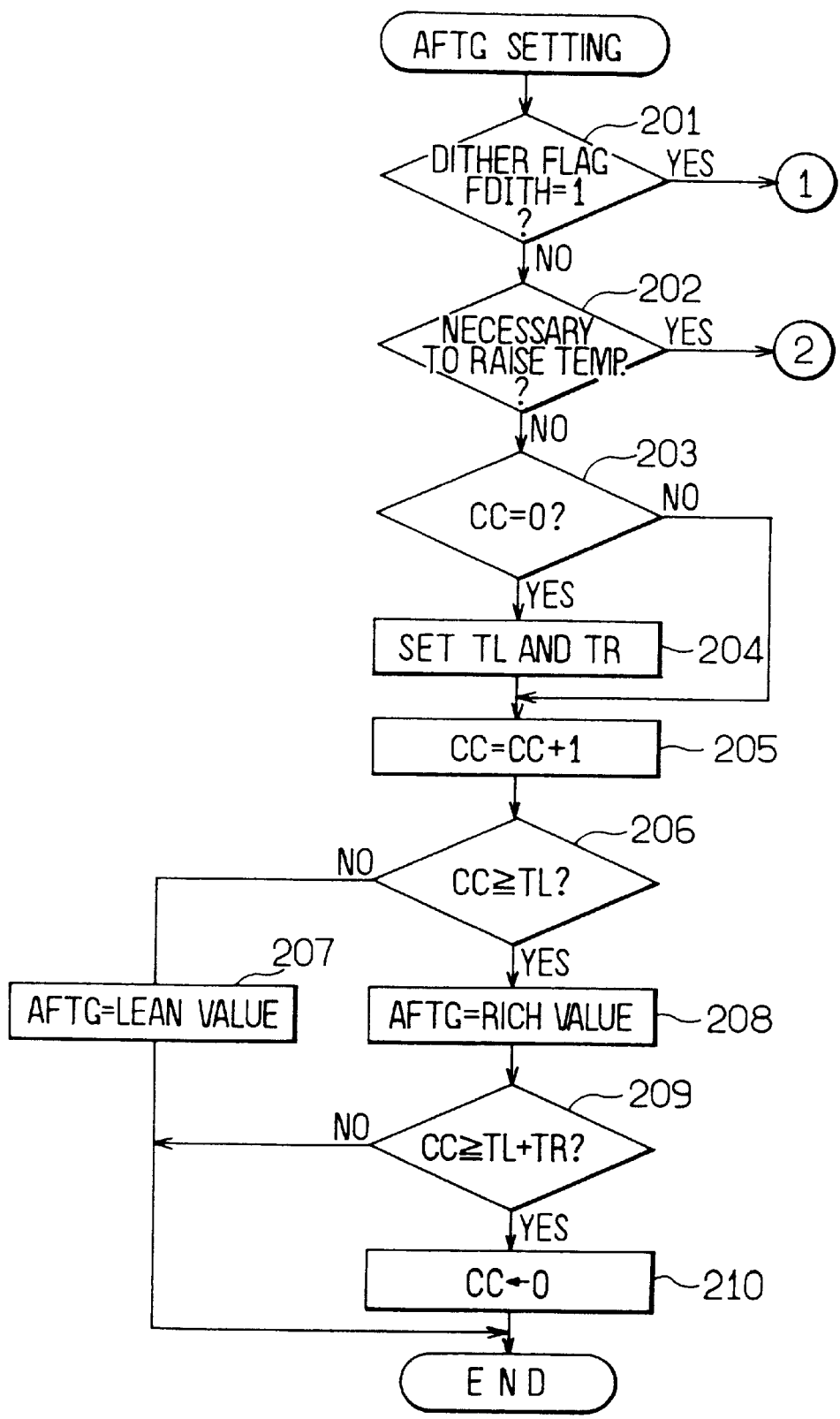
FIG. 5 is a flow diagram showing a part of target air-fuel ratio setting routine executed in the first embodiment.

First at step 201 in FIG. 5, a check is made to see if an injection dither flag FDITH which indicates the injection dither control being conducted is set at "1". Also, at step 202, it is checked if the NOx catalyst 15 needs a temperature rise by the injection dither control. For example, "YES" is determined at step 202:

(1) when the engine 1 is started cold;
(2) when the NOx catalyst 15 has become inactive because of a temperature drop after a long-time idling operation; or
(3) when it is determined by other routine (not shown) that the NOx catalyst 15 has been deteriorated with sulfur.

The above item (1) can be determined by an information from ignition key operation, coolant temperature Thw, etc. The above item (2) can be determined by supervising the temperature of the NOx catalyst 15 on the basis of a result of detection by the catalyst temperature sensor 28.

The deterioration of the NOx catalyst 15 stated in the above item (3) is determined as follows. That is, in the rich control, the output VOX2 of the rear $O_2$ sensor 27 is supervised, estimating the NOx occlusion capacity of the NOx catalyst 15 on the basis of the peak value of VOX2 or the time integral (surface area) of change in VOX2. Then, the degree of catalyst deterioration is detected on the basis of the NOx occlusion capacity thus estimated. At this time, it is determined that the greater the peak value of NOX, or the greater the time integral (surface area) of change in VOX2, the greater the degree of catalyst deterioration caused by a lowered NOx occlusion capacity of the NOx catalyst 15. Specifically, as seen in FIGS. 10A and 10B, if the degree of catalyst deterioration differs, the peak value of the rear $O_2$ output VOX2 differs. Since the peak value in FIG. 10B is greater than that in FIG. 10A, it can be determined that the catalyst deterioration has proceeded.

When "NO" is determined at both steps 201 and 202, the target air-fuel ratio AFTG is set to temporarily perform the rich control (rich purge) in the course of the lean control at steps 203 to 210. When "YES" is determined at either step 201 or step 202, the target air-fuel ratio AFTG is set in order to perform the injection dither control at steps 211 through 221 and 230 in FIG. 6.

At step 203, it is determined whether the value given by a cycle counter CC which counts every fuel injection is zero or not. The routine proceeds to step 204 on the condition that the cycle counter gives 0. At step 204 the lean time TL and the rich time TR are set on the basis of the engine speed Ne and the intake pressure PM. When step 203 determines "NO" (CC≠0), the processing at step 204 will be skipped.

The lean time TL and the rich time TR correspond to a fuel injection frequency at each lean air-fuel ratio and a fuel injection frequency at each rich air-fuel ratio. Basically, the higher the engine speed or the higher the intake pressure PM, the greater values will be set. The lean time TL is given by multiplying the rich time TR by a predetermined factor (TL=TR x Predetermined factor). The predetermined factor of a fixed value of around "50" is satisfactory and may be set as a variable value in accordance with such engine operating conditions as Ne and PM.

Subsequently at step 205, the cycle counter reading CC is incremented by "1", and at the following step 206 it is checked if the reading of the cycle counter has reached a value equivalent to the lean time TL. When the reading of the cycle counter CC is greater than TL, the target air-fuel ratio AFTG based on Ne and PM is set to a lean control value at step 207. After the setting of the AFTG value, the routine is completed, then going back to step 103 (FAF setting) in FIG. 4.

The AFTG value at step 207 is determined by referring to a predetermined target air-fuel ratio map based for example on the engine speed Ne and the intake pressure PM, setting a value which corresponds to for example A/F=20 to 23. In case that the lean control conditions are not established because of non-steady operation, the AFTG value will be set in the vicinity of the stoichiometric air-fuel ratio (A/F=14.7). In such a case, the air-fuel ratio is controlled by the lean control set at step 207.

In the case when the cycle counter reading CC≧TL, the target air-fuel ratio AFTG is set to a rich control value at step 208. The AFTG value at step 208 may be set as a fixed value in the RICH region, and also may be set as a variable value through map-retrieval on the basis of Ne and PM. When the map-retrieval is carried out, the AFTG value is set in such a manner that the higher the engine speed Ne or the intake pressure PM, the higher the degree of fuel enrichment becomes.

Thereafter at step 209, a check is made to determine if a value read by the cycle counter CC has reached a value equivalent to the total TR time "TL+TR". When the cycle counter reading CC<TL+TR, the routine is completed, going back to step 103 in FIG. 4. In this case, the air-fuel ratio is controlled by the rich control by using the AFTG set at step 208.

When the cycle counter CC≧TL+TR and step 209 has determined "YES", the cycle counter CC is cleared to "0" at step 210. Thereafter the routine is completed, going back to step 103 in FIG. 4. With the clearing of the cycle counter, step 203 determines "YES" by the subsequent routine, at which the lean time TL and the rich time TR are newly set. Then, the lean control and rich purge control are effected again on the basis of the lean time TL and the rich time TR.

Figure 6:
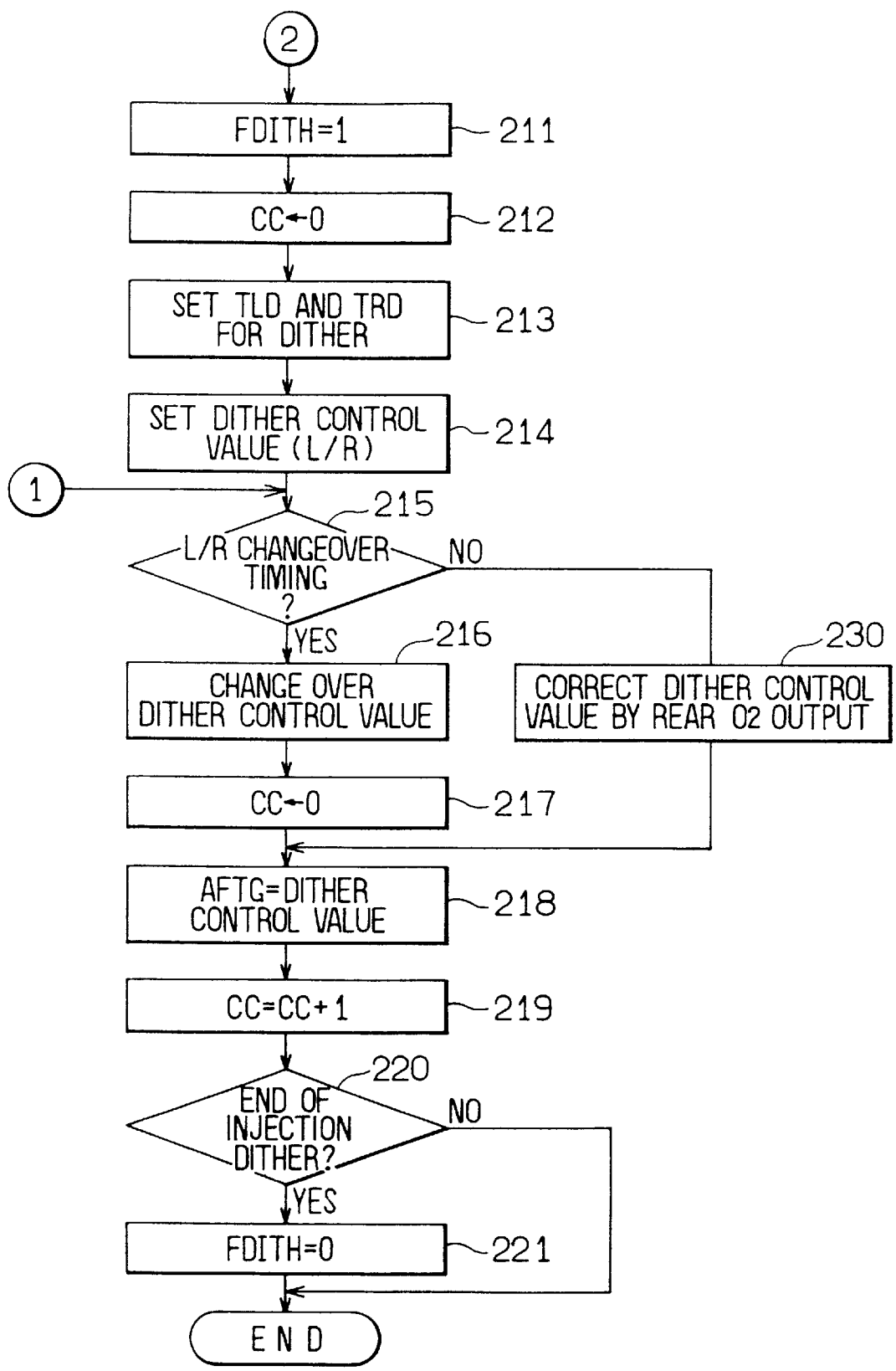
FIG. 6 is a flow diagram showing the other part of the target air-fuel ratio setting routine executed in the first embodiment.

In the meantime, when a temperature rise of the NOx catalyst 15 is required because of deterioration or non-activation of the NOx catalyst 15, step 202 is determined "YES", the routine proceeding to step 211 in FIG. 6. At step 211, "1" is set at the injection dither flag FDITH, then at step 212 the cycle counter is cleared to "0". Subsequently at step 213, the dither lean time TLD and the dither rich time TRD are set. At step 214, the lean and rich degrees (the dither control value) in the injection dithering are set.

The dither lean time TLD and the dither rich time TRD are set, according to the engine speed Ne and the intake pressure PM, as an interval including a period during which the lean and rich components in the exhaust gas reacts with the three-way catalyst 14 on the upstream side and thereafter a period during which an unreacted exhaust gas passes through the three-way catalyst 14. For example, TLD and TRD are set at short values during high-speed, high-load engine operation at which the exhaust gas flows at a high velocity. At this time, it is preferred that TLD and TRD be set to the time when the fuel injection frequency of the fuel injector 7 corresponds to about 20 to 100 injections. The lean degree and the rich degree are set in accordance with the range of temperature rise of the NOx catalyst 15 which is determined by the injection dither control. For example, the larger the desired range of temperature rise, the greater the lean degree and the rich degree will be set. It is also preferred that TLD, TRD, and lean (L)/rich (R) degree be preset as fixed values.

It is, however, desired to set the TLD, TRD, and lean/rich degree be set so that the mean value of the air-fuel ratio will become the stoichiometric air-fuel ratio ($\lambda$=1) and that the time integral of the air-fuel ratio to the lean side and the time integral of the air-fuel ratio to the rich side will agree, whereby engine torque variations during injection dithering can be controlled.

Then at step 215, the lean/rich changeover timing in the injection dithering is determined according to the reading of the cycle counter CC. During the initial period of the injection dithering, "NO" is determined at step 215, proceeding to step 230, where the dither control value of the air-fuel ratio is corrected in accordance with the output VOX2 of the rear $O_2$ sensor 27.

Figure 8:
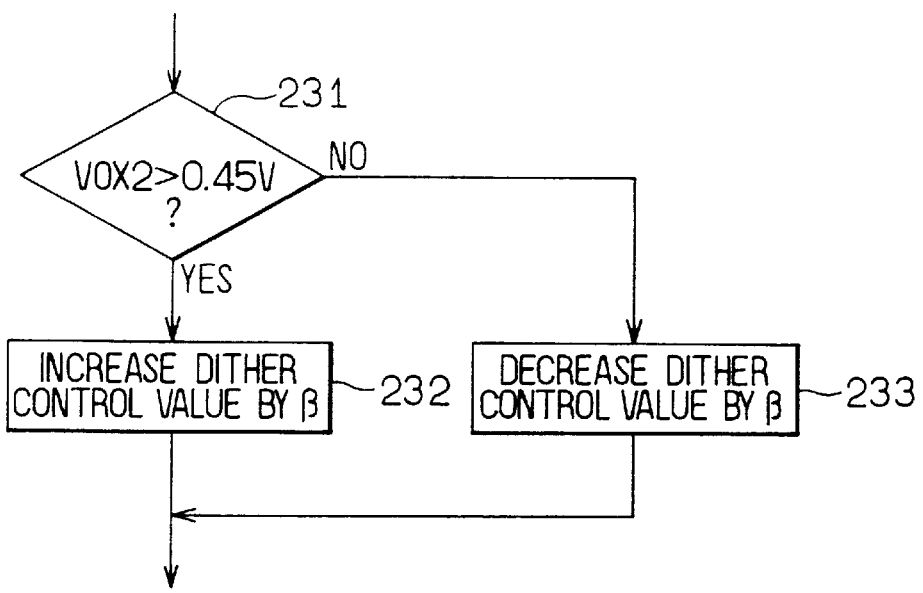
FIG. 8 is a flow diagram showing a dither control value correcting routine executed in the first embodiment.

In the correction of the dither control value, as shown in FIG. 8, it is determined at step 231 whether or not the output VOX2 at the rear $O_2$ sensor 27 exceeds 0.45V, that is, whether or not the rich air-fuel mixture is present on the downstream side of the NOx catalyst 15. When the air-fuel mixture is rich (VOX2>0.45V), the air-fuel mixture is leaned by increasing the dither control value (A/F value) by a predetermined value $\beta$ at step 232. If, in this case, the dither control value indicated is lean, the lean degree is increased by the predetermined value $\beta$, and reversely if the dither control value is rich, the rich degree is decreased by the predetermined value $\beta$. Furthermore, when the air-fuel mixture is lean (VOX2≦0.45V), the air-fuel mixture is enriched by decreasing the dither control value (A/F value) by the predetermined value $\beta$ at step 233. That is, in this case, when the dither control value is lean, the lean degree is decreased by $\beta$, and reversely when the dither control value is rich, the rich degree is increased by $\beta$.

Figure 9:
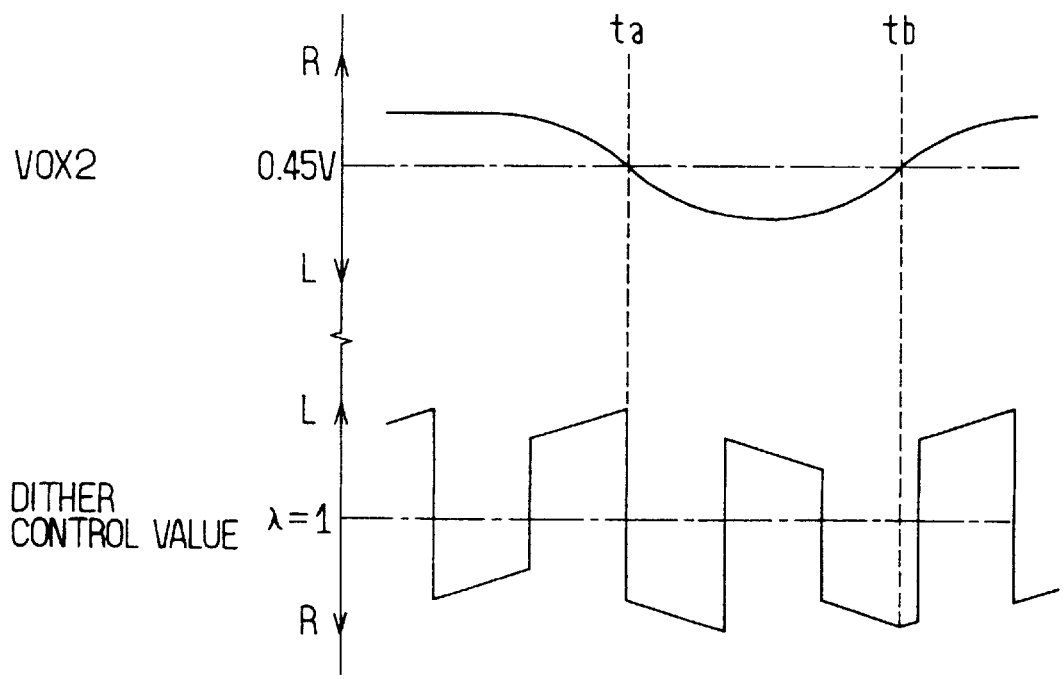
FIG. 9 is a timing diagram showing operation of the dither control value correction in the first embodiment.

The correction of the dither control value will be explained by referring to FIG. 9. Since VOX2>0.45 before time ta, the air-fuel mixture is gradually leaned regardless of the dither control value. Since VOX≦0.45 from time ta to time tb, the air-fuel mixture is gradually enriched, either lean or rich.

This correction of the dither control value may be made only at the changeover timing when the output VOX2 of the rear $O_2$ sensor 27 is changed at 0.45V, or only when the lean/rich changeover of the dither control value is performed.

After step 230, the routine proceeds to step 218, at which the dither control value is set as the target air-fuel ratio AFTG. At step 218, either the target air-fuel ratio AFTG on the rich side or the target air-fuel ratio AFTG on the lean side is set on the basis of the stoichiometric air-fuel ratio (∥=1).

Next, at step 219, the cycle counter reading CC is incremented by "1". At the following step 220, it is determined whether the injection dither is ended or not. If the injection dither is not ended, the routine is finished as it is, then returning to step 103 in FIG. 4.

When the routine is carried out subsequently, step 201 of FIG. 5 determines "YES", then proceeding to step 215 of FIG. 6. At the lean/rich changeover timing (CC=TLD or TRD), step 215 determines "YES". Furthermore at step 216, the dither control value is reversed between lean and rich. Next, at step 217, the cycle counter reading CC is cleared to "0". Thereafter, at step 218, the dither control value at that time is set as the target air-fuel ratio AFTG. At step 219, the cycle counter reading CC is incremented by "1".

At step 220, in determining the end of the injection dither, "YES" is determined after the lapse of a preset time for recovery of deteriorated catalyst (deteriorated by sulfur) for example, in the case the injection dither has been performed for the recovery of deteriorated catalyst. Also, if the injection dither has been performed for activation of the NOx catalyst 15, step 220 determines "YES" when the temperature of the NOx catalyst detected by the catalyst temperature sensor 28 has reached a predetermined activation temperature. When the injection dither is finished, the routine is ended after clearing the injection dither flag FDITH to "0" at step 221, then returning to the step 103 in FIG. 4.

Figure 7:
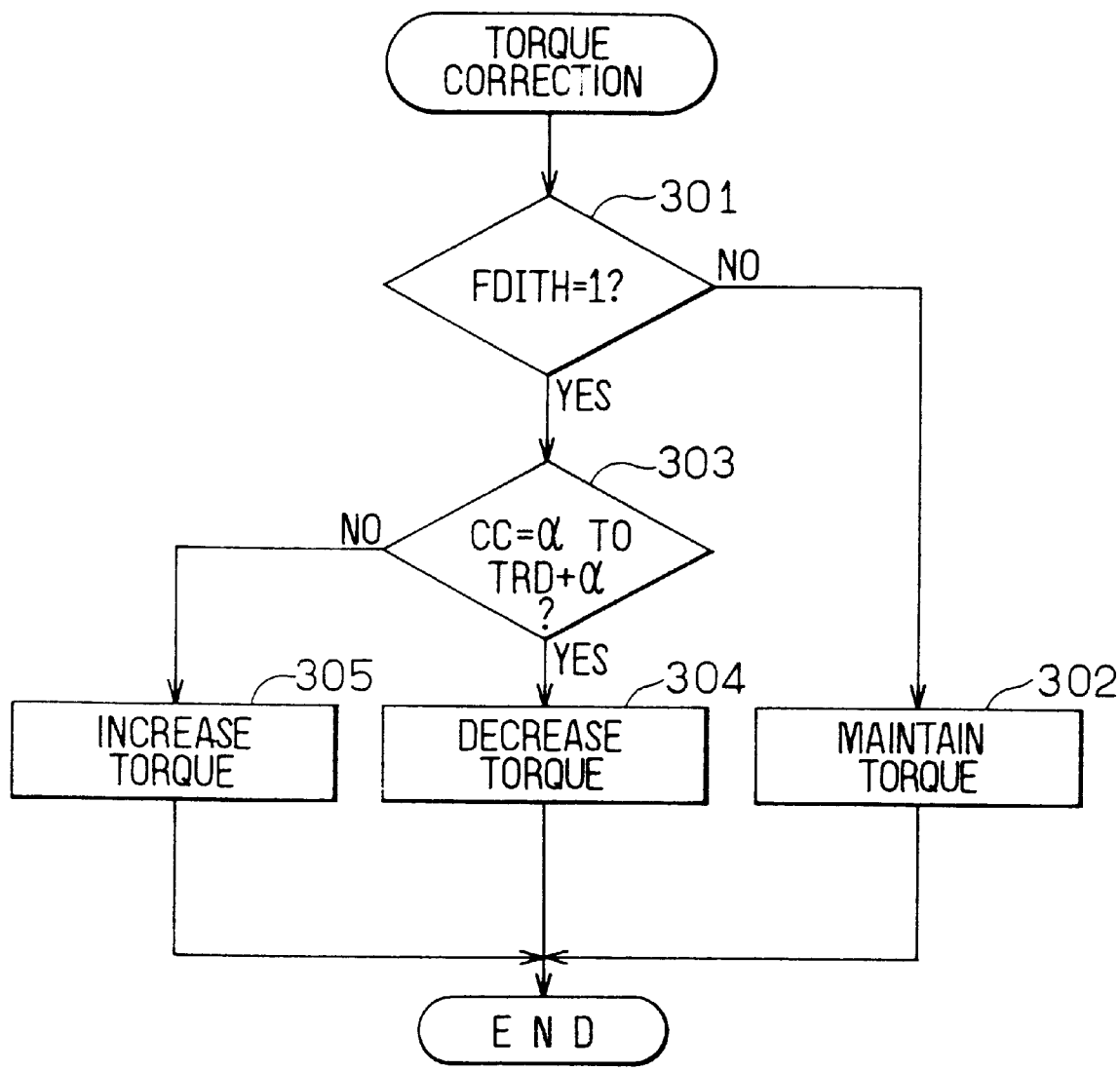
FIG. 7 is a flow diagram showing a torque correcting routine executed in the first embodiment.

FIG. 7 is a flow diagram showing an engine torque correcting routine for increasing or decreasing the engine torque during injection dithering. The routine is carried out by means of the CPU 31 at a predetermined period of time. The amount of correction of the ignition timing or the amount of correction of the throttle opening angle set by the routine is reflected in an ignition timing control routine or throttle control routine (not shown) in a conventional manner.

Specifically, first at step 301, whether or not the injection dither flag FDITH is "1" is determined. When FDITH=0 and the injection dither is not carried out, the routine proceeds to step 302. At step 302, no engine torque correction is performed to maintain the torque, thus completing the processing.

Because FDITH=1 and if the injection dither has been effected, the processing proceeds to step 303, at which a decision is made on whether or not the cycle counter CC is within the range of "$\alpha$ to TRD+$\alpha$". "$\alpha$" denotes a predetermined delay time. If "YES" at step 303, the correction of the amount of torque decreased at step 304 is made. Specifically, the ignition timing is retarded as much as predetermined, and the throttle opening is controlled to the closed side by the predetermined amount to decrease for correcting the quantity of intake air.

Furthermore, if "NO" is determined at step 303, correction is made by increasing the torque at step 305. Specifically, the ignition timing is advanced by a predetermined amount and the throttle opening is controlled to the open side by a predetermined amount, thereby increasing to correct the quantity of intake air.

Figure 11:
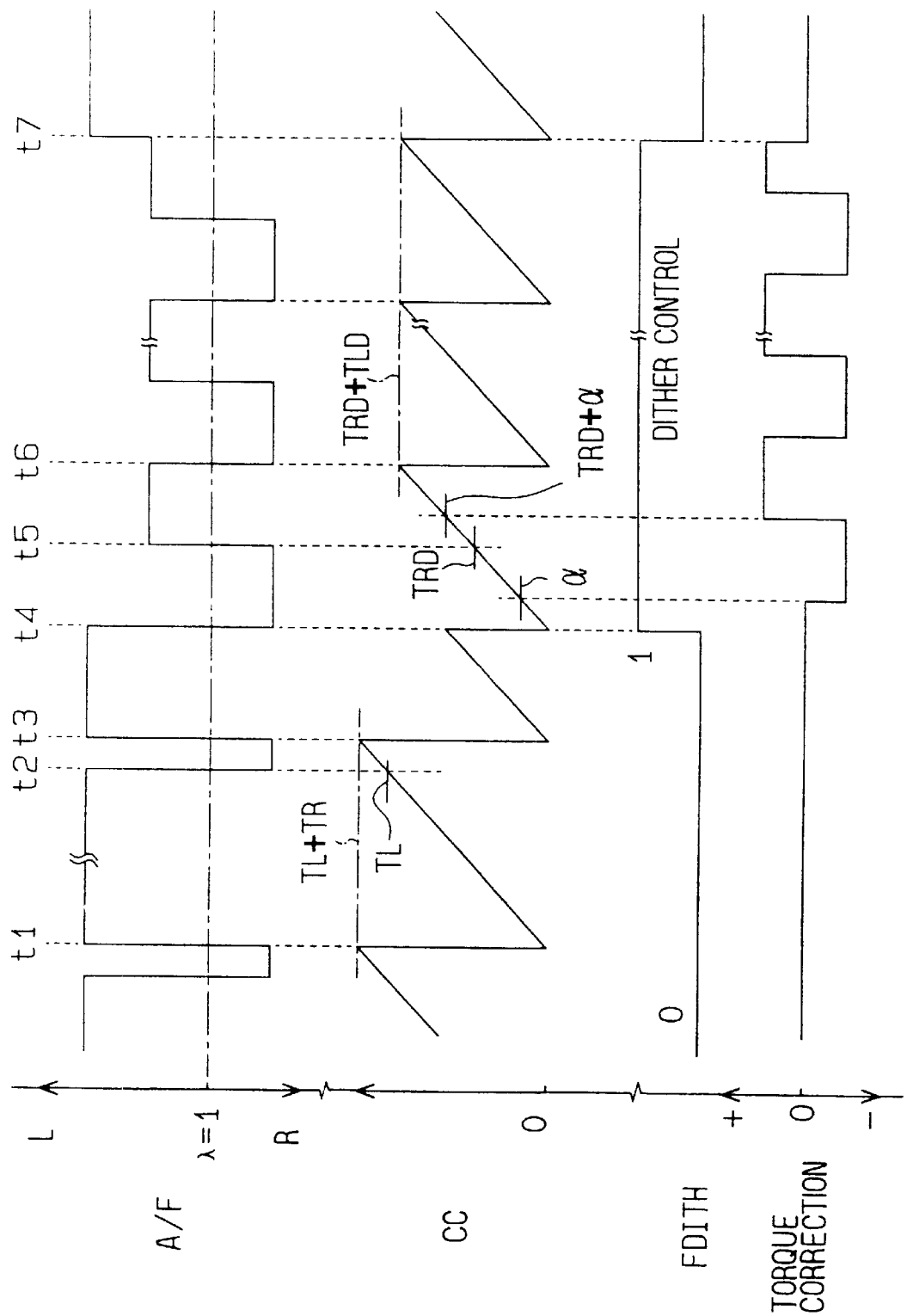
FIG. 11 is a timing diagram particularly showing operation of air-fuel ratio control in the first embodiment.

FIG. 11 is a timing diagram showing in more detail the control described with reference to FIGS. 4 to 7. In FIG. 11, time t4 to time t7 represents a period of injection dithering. The air-fuel ratio is controlled by leaning the air-fuel mixture during the period of the time t1 to time t2 (cycle counter CC=period of O to TL), to thereby occlude NOx from the exhaust gas into the NOx catalyst 15. During the period of time t2 to t3 (cycle counter CC=period of TL to TL+TR), the rich purge control is conducted to reduce and discharge the occluded NOx of the NOx catalyst 15 by unburned gas components (HC, CO) present in the exhaust gases. The lean control and the rich purge control of the air-fuel ratio are repetitively performed according to the lean time TL and the rich time TR. Before time t4, the ratio of the lean control to the rich purge control is, for example, 500 injections to 10 injections.

Thereafter, when "1" is set at the injection dither flag FDITH at the time t4, TLD, TRD, and lean/rich degrees are set by the injection dither control. At time t4 to t5, the rich control is effected until the cycle counter reading CC reaches the time equivalent to TRD, and at the time t5 and t6, the lean control is performed until the cycle counter reading CC reaches the time equivalent to TRD+TLD. After time t4, the injection dither control is performed at the lean/rich changeover cycles of about 20 to 100 injections. In FIG. 11, however, the correction of the dither control value (step 230 in FIG. 6) according to the output VOX2 of the rear $O_2$ sensor 27 is not illustrated.

In the injection dither control to be effected after time t4, engine torque correction is made by increasing or decreasing the torque after a delay of the predetermined time $\alpha$. That is, in the period of cycle counter CC=$\alpha$ to TRD+$\alpha$, the engine torque correction is performed by decreasing the ignition delay angle and the amount of intake air for the purpose of reducing the engine torque in relation to the rich control from time t4 to time t5. Also, in the period of cycle counter CC=TRD+$\alpha$ to TRD+TLD, 0 to $\alpha$, torque increase correction is performed by increasing the ignition advance angle and the amount of intake air for the purpose of increasing the engine torque in relation to the lean control from time t5 to time t6.

After the injection dither control, at time t7, the injection dither flag FDITH is cleared. Then after time t7, the lean and rich purge controls are restarted. With the clearing of the injection dither flag FDITH, the torque correction will be stopped, but may be continued for the specific period of time $\alpha$.

Next, by referring to FIGS. 12 and 13, an explanation will be made about the behavior of a temperature rise of the NOx catalyst 15 during recovery of purifying capacity of the NOx catalyst 15 and on cold start of the engine.

Figure 12:
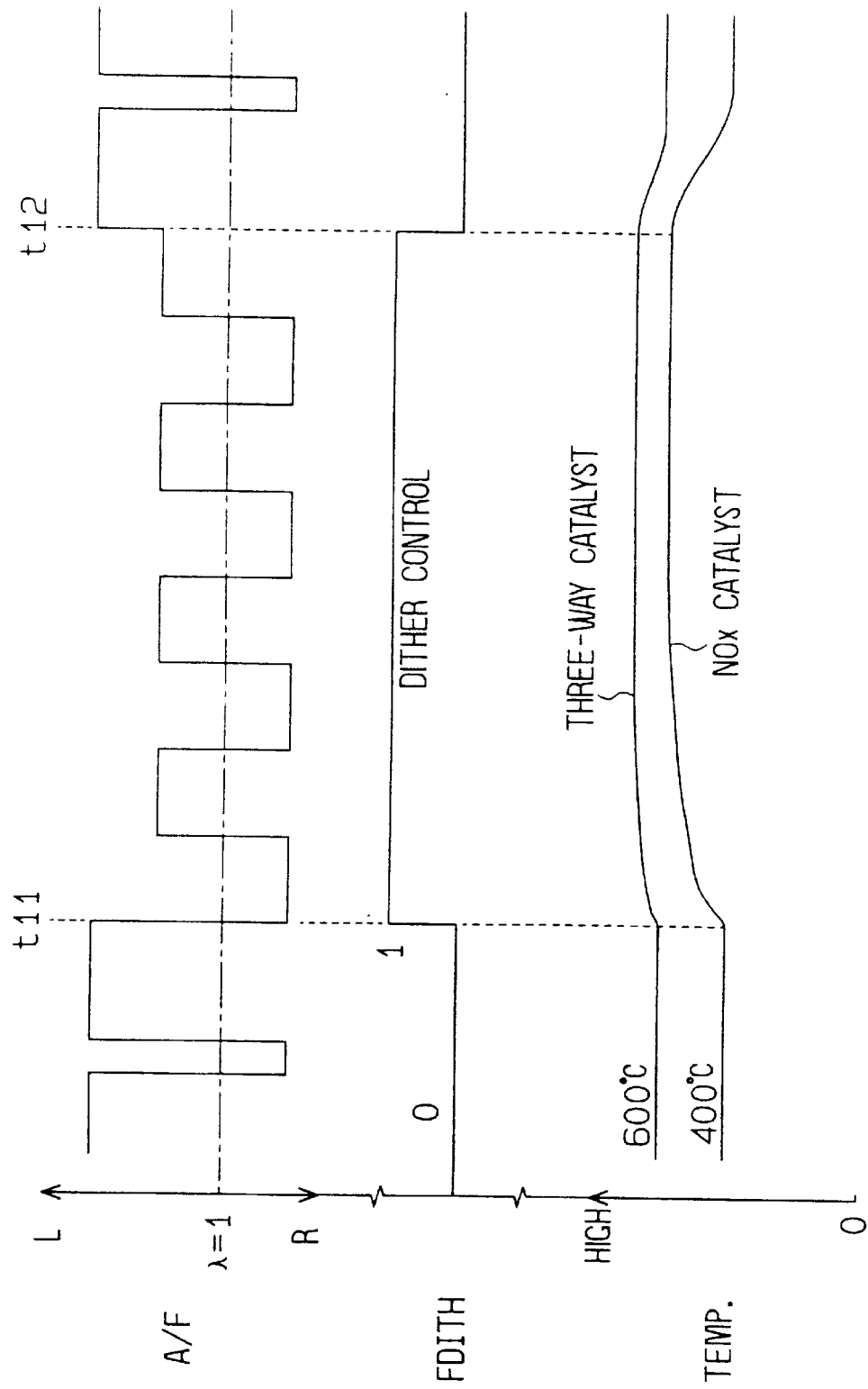
FIG. 12 is a timing diagram showing a transition of the catalyst temperature during deterioration and regeneration of a NOx catalyst in the first embodiment.

FIG. 12 is a timing diagram showing the transition of a catalyst temperature during injection dithering carried out for the purpose of recovering the sulfur-deteriorated NOx catalyst 15. In FIG. 12, before time t11, the lean and rich purge controls are performed. At this time, the upstream three-way catalyst 14 is held at the temperature of around 600° C., while the downstream NOx catalyst 15, at the temperature of around 400° C.

At time t11, sulfur-deterioration of the NOx catalyst 15 is detected, and "1" is set at the injection dither flag FDITH. After time t11, the injection dither control is effected, whereby the temperature of the three-way catalyst 14 rises slightly to around 620° C., while the temperature of the NOx catalyst 15 rises by around 100° to 150° to around 500° C. to 550° C. To this high-temperature NOx catalyst 15, rich components arc supplied to reduce barium sulfate $BaSO_4$ produced by sulfur deterioration, releasing sulfur to thereby regenerate the NOx catalyst 15.

At preset time t12 when the predetermined time for regeneration of deteriorated catalyst, after the regeneration of the NOx catalyst 15, the injection dither flag FDITH is cleared to "0", thus completing the injection dither. Thereafter, the temperatures of the three-way catalyst 14 and the NOx catalyst return to the original values (600° C. and 400° C.).

Figure 13:
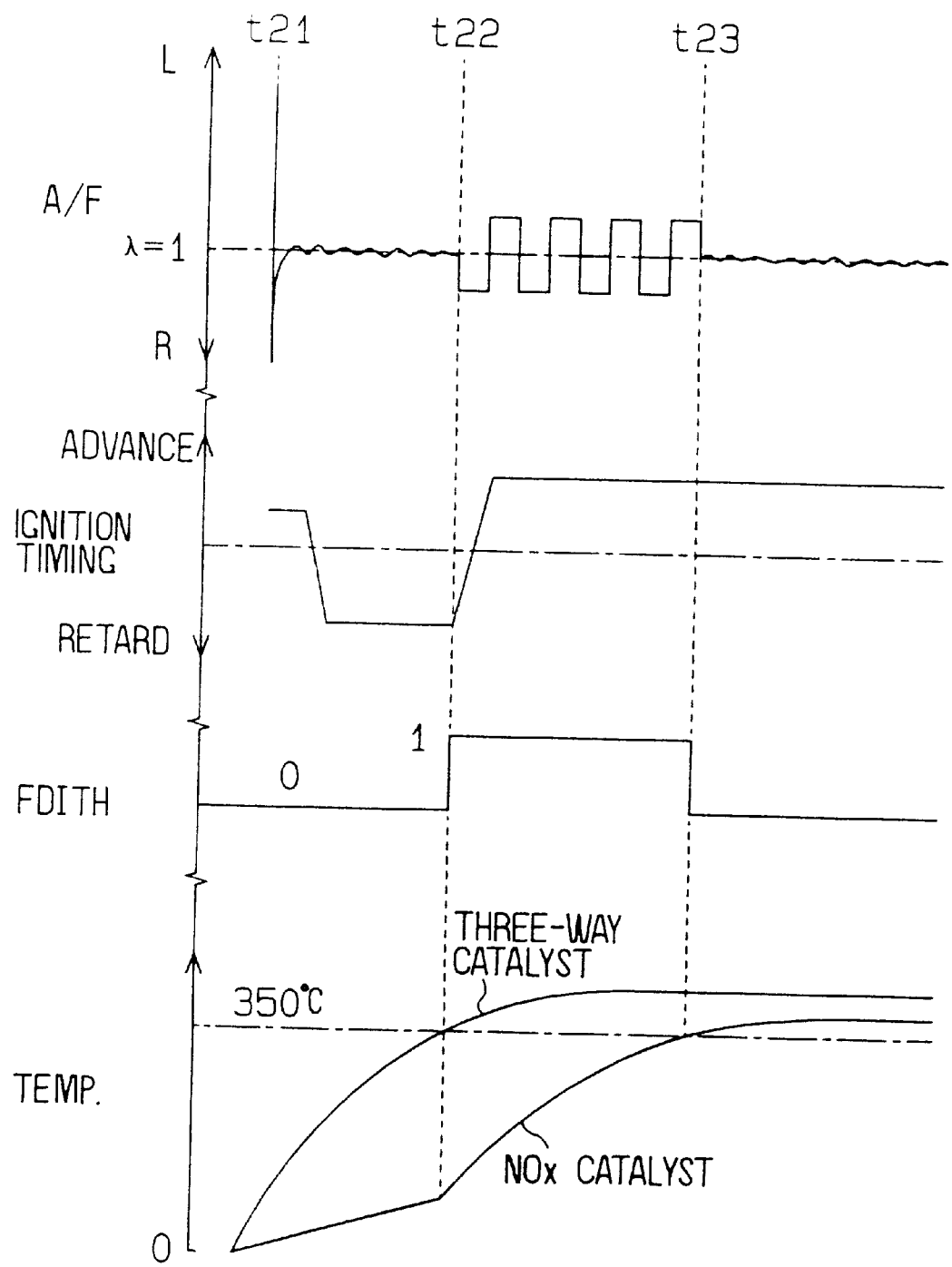
FIG. 13 is a timing diagram showing a transition of the catalyst temperature during engine start-up in the first embodiment.

FIG. 13 is a timing diagram showing the transition of catalyst temperature during the injection dithering effected for the purpose of activation of the NOx catalyst 15 on cold start of the engine 1.

In FIG. 13, when the engine 1 is started at time t21, the ignition timing is controlled to the delay (retard) side, thereby accelerating early activation of the three-way catalyst 14 on the upstream side. The processing of the ignition delay angle on engine starting is well known and therefore is not described in the operation of the CPU 31.

At time t22 when the temperature of the three-way catalyst 14 has reached the predetermined activation temperature (e.g., 350° C.), completing the activation of the three-way catalyst 14, the ignition timing is set back to the normal timing, to thereby perform the injection dither control instead. In FIG. 13, however, ignition timing correction for torque correction during the injection dithering is not performed for convenience.

Thereafter, upon performing the injection dither control, the NOx catalyst 15 starts a quick temperature rise. During the injection dithering, the temperature rise of the upstream three-way catalyst 14 is restrained. Only the downstream NOx catalyst 15 rises in temperature. Then at time t23, the temperature of the NOx catalyst 15 reaches a predetermined activation temperature, thus completing the injection dithering.

According to the above first embodiment, the following advantages are provided.

(a) In the injection dither control, because the lean components and the rich components in the exhaust gases pass as unreacted through the three-way catalyst 14 on the upstream side, the NOx catalyst 15 on the downstream side can properly be raised in temperature without unnecessarily heating the three-way catalyst 14 on the upstream side, and accordingly satisfactorily clean the exhaust gases. Furthermore, the three-way catalyst 14, being controlled from overheating, can be prevented from deterioration.

(b) During engine operation in which the exhaust gases are flowing at a high velocity, the lean/rich changeover intervals are shortened and the lean degree and the rich degree are set according to a desired range of temperature rise at the NOx catalyst 15 on the downstream side. Therefore, it is possible to supply the NOx catalyst 15 with a proper amount of lean and rich components needed for the desired temperature rise of the NOx catalyst 15.

(c) The injection dither control is carried out so that the mean air-fuel ratio during the lean/rich changeover will become the stoichiometric air-fuel ratio. Therefore engine torque variations resulting from the magnitude of the air-fuel ratio can be controlled.

(d) When the three-way catalyst 14 on the upstream side is a relatively small-capacity catalyst for early engine warm-up, and when the NOx catalyst 15 on the downstream side is used as a main catalyst, only the NOx catalyst 15 on the downstream side sometimes become inactivated during engine operation. It is, however, possible to raise the temperature of only the NOx catalyst 15 for efficient activation.

(e) When the deteriorated NOx catalyst 15 is regenerated, it is possible to properly recover the exhaust gas purifying capacity of the NOx catalyst 15 by increasing the temperature of only the NOx catalyst 15, for catalyst regeneration, without raising the temperature of the three-way catalyst 14.

(f) In the injection dither control, the correction of engine torque is made by increasing and decreasing the torque, to control engine torque variations likely to occur in the injection dither control effected at intervals of a large magnitude, thereby enabling realization of good drivability.

Second Embodiment

In a second embodiment, the upstream catalyst and the downstream catalyst are activated successively after engine starting. In this activation process, details of the injection dither control are altered. That is, after engine start-up, the first injection dither control (the first control) to be conducted at relatively short lean/rich changeover intervals is performed until the activation of the three-way catalyst 14 on the upstream side, and the second injection dither control (the second control) to be perform ed at relatively long lean/rich changeover intervals is performed until the activation of the NOx catalyst 15 on the downstream side.

Figure 14:
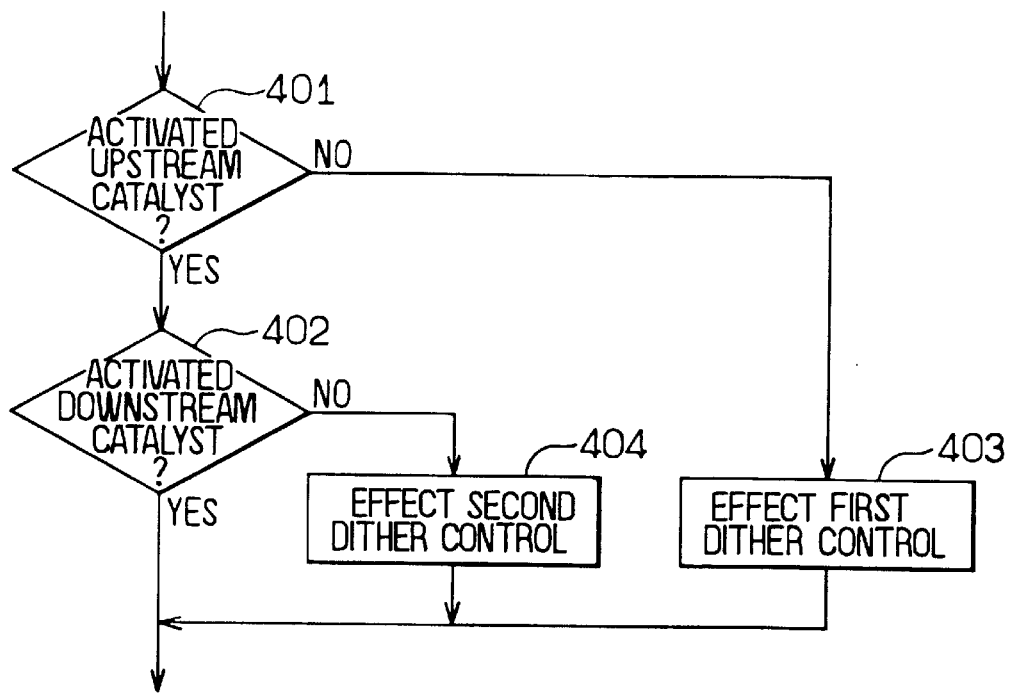
FIG. 14 is a flow diagram showing a part of the air-fuel ratio control routine executed in a second embodiment of the present invention.

In the second embodiment, therefore, additional processing routine is provided as shown in FIG. 14. At step 401, after engine start-up, whether the three-way catalyst 14 on the upstream side has been activated is determined. At the subsequent step 402, whether the NOx catalyst 15 on the downstream side has been activated is determined. The decision of activation of the catalysts 14 and 15 may be carried out for the sake of expediency at a specific time of lapse from engine start-up, and also may be carried out in accordance with a detected value from a catalyst temperature sensor.

In case the three-way catalyst 14 on the upstream side is inactivated ("NO" in step 401), the routine proceeds to step 403, where the first injection dither control is carried out. The three-way catalyst 14 is warmed up in an earlier period than the NOx catalyst 15. In the case of "NO" at step 401, it will be determined that both the catalysts on the upstream and downstream sides are inactive. Also, when only the NOx catalyst 15 on the downstream side is inactive ("NO" at step 402), the routine goes to step 404, where the second injection dither control is performed. When "YES" is determined at either of steps 401 and 402, no injection dither control is carried out, and a normal air-fuel ratio control is carried out.

Details of the first and second injection dither control routines are basically the same as those described in the first embodiment, and therefore will not be described herein. However, only a difference lies in that, in the first injection dither control, unreacted exhaust gases hardly pass through the three-way catalyst 14 on the upstream side. The lean and rich controls are changed over at intervals (injection frequency) at which almost all the lean and rich components react with the three-way catalyst 14, thereby accelerating the activation of the three-way catalyst 14. In the second injection dither control, the lean and rich controls are changed over at intervals (injection frequency) at which the unreacted exhaust gases can pass through the three-way catalyst 14 on the upstream side, thereby restraining a temperature rise at the three-way catalyst 14 and accordingly accelerating the activation of the NOx catalyst 15.

More specifically, the lean and rich controls are changed over at intervals of 1 to 5 injections in the first injection dither control, and at intervals of 20 to 100 injections in the second injection dither control. Whether or not the ignition delay control should be made during a period until the activation of the three-way catalyst 14 on the upstream side after engine start-up may be freely determined.

According to the second embodiment, it is possible to perform efficient activation of the three-way catalyst 14 and the NOx catalyst 15 during engine start-up. At this time, catalyst deterioration can be prevented without unnecessarily heating the three-way catalyst 14 on the upstream side.

Third Embodiment

Figure 15:
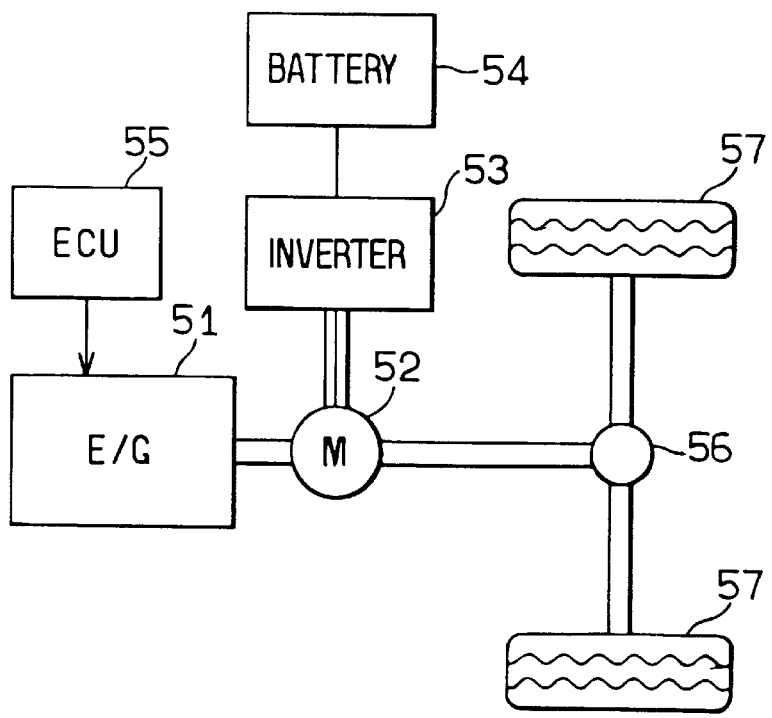
FIG. 15 is a schematic diagram showing a hybrid motor vehicle in a third embodiment of the present invention.

In a third embodiment, the above air-fuel ratio control is applied to hybrid motor vehicles. Generally, as the hybrid system for motor vehicles, two kinds of hybrid systems have been known. One is a series hybrid system which drives the wheels with an electric motor and supplying the electric power to the electric motor from the engine. The other is a parallel hybrid system which directly drives the wheels with both the engine and the electric motor. The present invention is applicable to either system. FIG. 15 shows the latter hybrid system. The hybrid car shown in FIG. 15 comprises mainly an engine 51, an electric motor 52, an inverter 53 for driving the electric motor 52, a battery 54 electrically connected with the inverter 53, and an engine ECU 55 for air-fuel ratio control and ignition timing control of the engine 51. The output of the engine 51 or the electric motor 52 is transmitted to the right and left driving wheels 57 via a differential gear 56. In the exhaust pipe of the engine 51, a couple of exhaust gas purifying catalysts (not shown) are mounted at the upstream and downstream sides.

Figure 16:
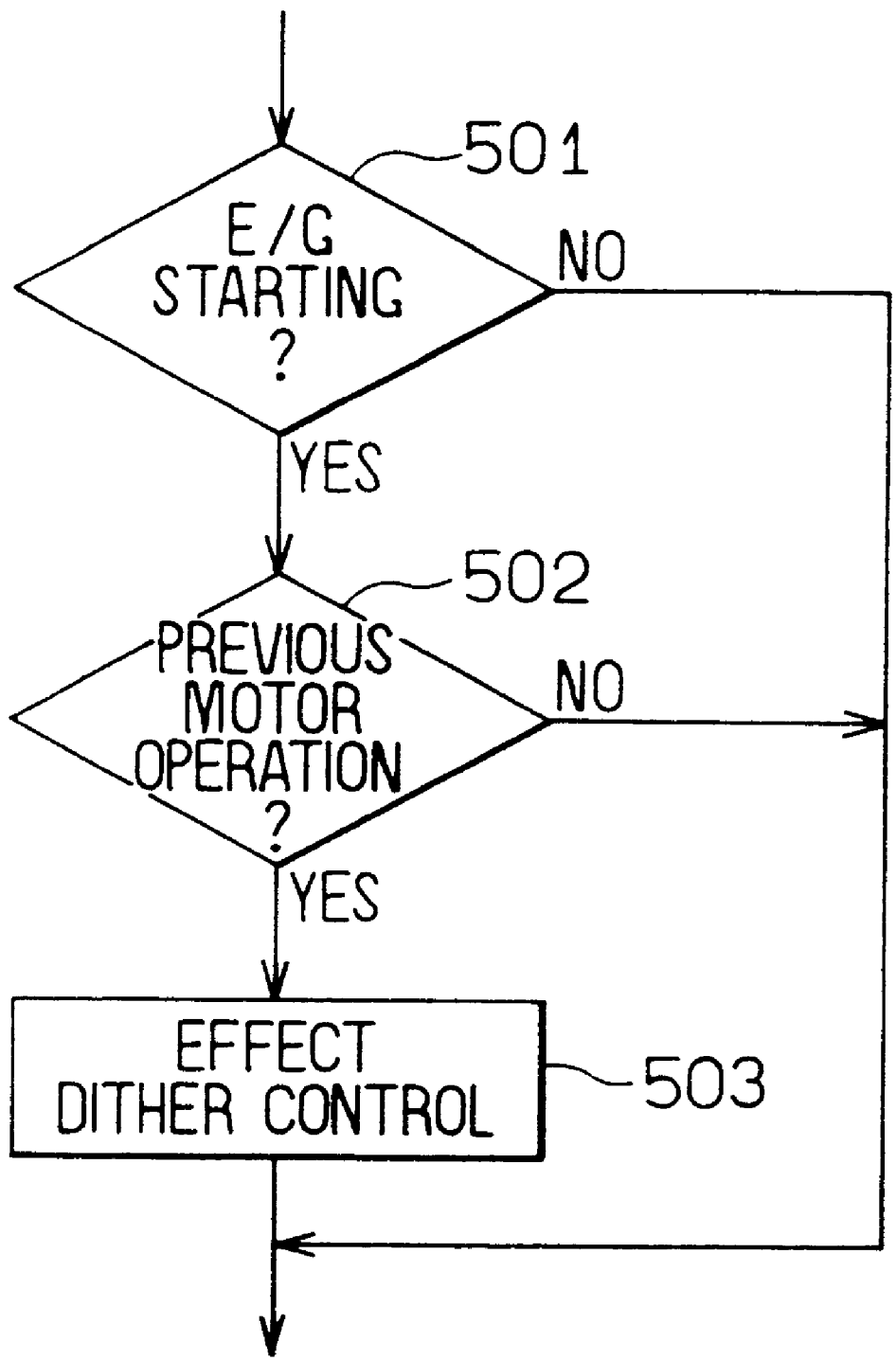
FIG. 16 is a flow diagram showing a part of the air-fuel ratio control routine executed in the third embodiment.

FIG. 16 is a flow diagram showing a part of the air-fuel ratio control routine to be effected by the engine ECU 55.

At step 501 of FIG. 16, a decision is made on whether or not the engine 51 is started in accordance with a vehicle driving condition. At the following step 502, a decision is made on whether or not the electric drive of the motor 52 has continued over a specific period of time until the engine is started. When "YES" is determined at steps 501 and 502, the catalyst on the downstream side lowers in temperature during motor driving, and is assumed to require an increase in temperature. Subsequently, the program proceeds to step 503, at which the injection dither control is conducted. The injection dither control makes the lean/rich changeover at relatively long intervals (around 20 to 100 injections) as previously stated.

According to the third embodiment, only the catalyst on the downstream side can be efficiently activated by raising the temperature of the catalyst when the engine of the hybrid motor vehicle is restarted. In the third embodiment also, as the second embodiment, the first injection dither control and the second injection dither control may be changed over in accordance with the activated condition of the upstream and downstream catalysts at the time of engine start-up.

The present invention should not be limited to the above disclosed embodiments, but may be modified in many other ways.

For instance, the contents of the injection dither control may be altered in accordance with the construction of the exhaust system. Specifically, the greater the capacity of the downstream catalyst (NOx catalyst 15), the longer the reaction time required for increasing the temperature at the catalyst. Therefore, the lean/rich changeover period for the injection dither control is prolonged. Furthermore, the larger the capacity of the exhaust pipe mounted between the upstream catalyst (three-way catalyst 14) and the downstream catalyst (NOx catalyst 15), the more the lean and rich components which are mixed in the exhaust pipe. Therefore, the lean/rich changeover period of the injection dither control is similarly prolonged.

In the first embodiment, the dither control value of the air-fuel ratio was corrected according to the output VOX2 of the rear $O_2$ sensor 27 (Step 230 in FIG. 6). However, the air-fuel ratio correction factor FAF maybe increased or decreased in place of the correction. In this case, it is recommended to gradually decrease FAF when the output VOX2 is rich, and to gradually increase when the output VOX2 is lean.

In the first embodiment, the air-fuel ratio control system is designed to attain a feedback control of the air-fuel ratio within the lean range. In the exhaust pipe 12, the three-way catalyst 14 and the NOx catalyst 15 are provided in the exhaust pipe 12. This construction, however, is altered. For instance, in the air-fuel ratio control system for the air-fuel ratio feedback control to be conducted at the stoichiometric air-fuel ratio, a couple of three-way catalysts may be mounted on both the upstream and downstream sides of the exhaust pipe 12. In any case, in performing the injection dither control, it is possible to properly raise the temperature of the downstream three-way catalyst without unnecessarily heating the upstream three-way catalyst.

In the first embodiment described above, both the ignition timing control and the intake air quantity control are adopted for the purpose of torque correction during the injection dithering. Only one of these controls, however, may be carried out.

The above embodiments may also be applied to an air-fuel ratio control apparatus provided with more than three stages of exhaust gas purifying catalysts in the exhaust passage. In this case, the injection dither control should be performed with the lean/rich changeover interval (fuel injection frequency) so adjusted that the exhaust gas as unreacted will pass through to the downstream catalyst.

An A/F sensor may be used as a linear output-type air-fuel sensor, in place of the $O_2$ sensor 27, mounted on the downstream side of the NOx catalyst.

What is claimed is:
1. An air-fuel ratio control apparatus for internal combustion engines comprising:

upstream and downstream catalysts mounted on an upstream and downstream sides of an exhaust passage of an internal combustion engine for exhaust gas purification;

fuel injection means for injection of a quantity of fuel into a cylinder of the engine in accordance with an engine operating condition; and air-fuel ratio change means for changing lean and rich magnitude of an exhaust air-fuel ratio by alternately increasing and decreasing the magnitude for correcting the quantity of fuel injection;

wherein the air-fuel ratio change means performs lean/rich changeover of the exhaust air-fuel ratio at an internal including a period during which the lean and rich components in the exhaust gas react with the upstream catalyst and a period thereafter during which an unreacted exhaust gas passes through the upstream catalyst;

a first control of the lean/rich changeover of the exhaust air-fuel ratio is carried out at a relatively short interval at which an unreacted exhaust gas does not pass through the upstream catalyst when the upstream and downstream catalysts are both in an interactive condition; and a second control of the lean/rich changeover of the exhaust air-fuel ratio is carried out at a relatively long interval at which the unreacted exhaust gas passes through the upstream catalyst when only the downstream catalyst is in an inactive condition.

2. The air-fuel ratio control apparatus as in claim 1, wherein:

the upstream catalyst has a purifying capacity for early warm-up, and the downstream catalyst has a purifying capacity larger than that of the upstream catalyst.

3. The air-fuel ratio control apparatus as in claim 1, wherein:

the air-fuel ratio change means performs the lean/rich changeover at such an interval that a heating value and a quantity of heat released at the upstream catalyst nearly equals.

4. The air-fuel ratio control apparatus as in claim 1, wherein:

the lean/rich changeover interval is set in accordance with the operating condition of the engine, and is shortened as an exhaust gas velocity increases.

5. The air-fuel ratio control apparatus as in claim 1, wherein:

the air-fuel ratio change means sets lean and rich degrees in accordance with a temperature rise at the downstream catalyst, so that the lean and rich degrees are increased as the temperature rise increases.

6. The air-fuel ratio control apparatus as in claim 1, wherein:

the air-fuel ratio change means adjusts the air-fuel ratio so that the mean air-fuel ratio will become the stoichiometric air-fuel ratio at the time of lean/rich changeover.

7. The air-fuel ratio control apparatus as in claim 6, further comprising:

an air-fuel ratio sensor mounted further downstream of the downstream catalyst, to thereby correct the air-fuel ratio to be adjusted by the air-fuel ratio change means to the lean side and to the rich side in response to detection results of rich air-fuel ratio and lean air-fuel ratio, respectively.

8. The air-fuel ratio control apparatus as in claim 1, wherein:

the air-fuel ratio change means sets the lean/rich changeover interval to an interval of 20 to 100 injections by the fuel injection means.

9. The air-fuel ratio control apparatus as in claim 1, further comprising:

catalyst activation detecting means for detecting an activated condition of the downstream catalyst, wherein the lean/rich changeover of the exhaust air-fuel ratio is effected by the air-fuel ratio change means when the upstream catalyst is in an activated condition and the downstream catalyst is in an in activated condition.

10. The air-fuel ratio control apparatus as in claim 1, wherein:

the downstream catalyst is an NOx catalyst which occludes NOx in the exhaust gases; and the lean/rich changeover of the exhaust air-fuel ratio by the air-fuel ratio change is performed to regenerate the NOx catalyst.

11. The air-fuel ratio control apparatus as in claim 1, wherein:

the engine is mounted on a hybrid motor vehicle together with an electric motor as driving sources; and the lean/rich changeover of the exhaust air-fuel ratio is performed, when the engine is started and the fuel injection quantity is controlled after only the electric motor is continuously operated for a predetermined time.

12. The air-fuel ratio control apparatus as in claim 1, wherein:

the first control is carried out until activation of the upstream catalyst after the starting of the internal combustion engine; and the second control is carried out until activation of the downstream catalyst after the activation of the upstream catalyst.

13. The air-fuel ratio control apparatus as in claim 1, further comprising:

torque correcting means provided to perform torque control so that an output torque of the engine running on a lean air-fuel mixture and the output torque of the engine running on a rich air-fuel mixture nearly equals.

* * * * *